(No Model.)
O. C. CARR.
HEDGE TRIMMER AND LAWN MOWER COMBINED.
No. 421,241. Patented Feb. 11, 1890.
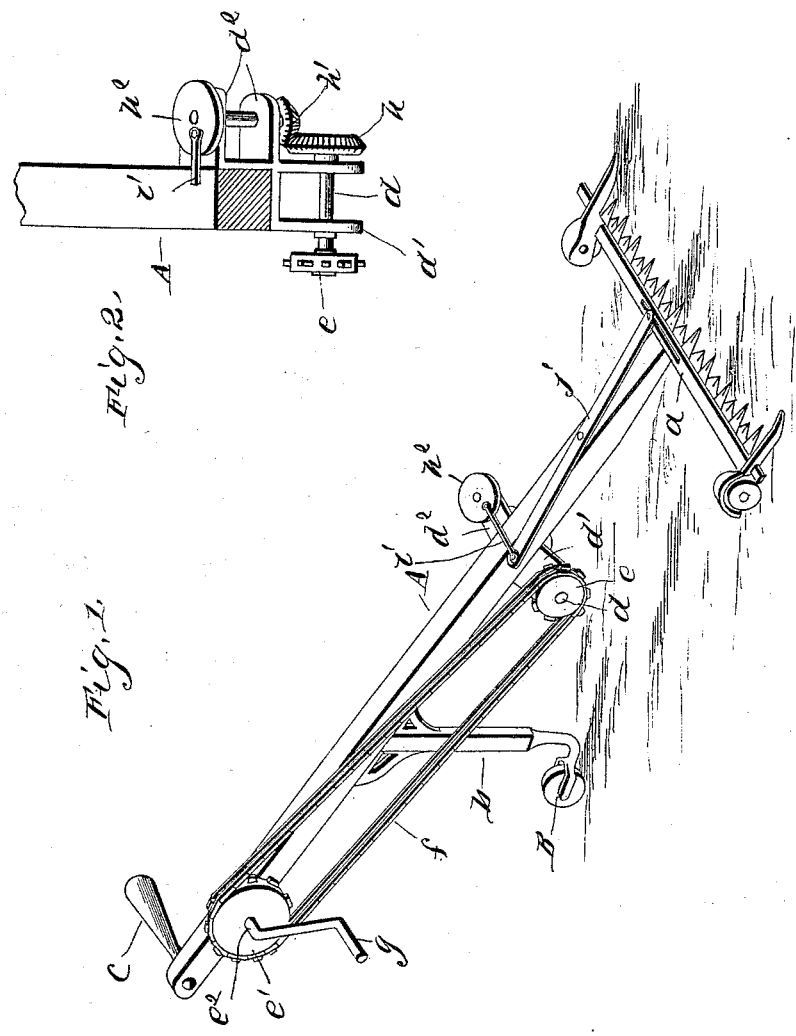
WITNESSES
INVENTOR
O. C. Carr,
by E. W. Anderson,
Attorney ns.

UNITED STATES PATENT OFFICE.

OMAR C. CARR, OF GRAND RAPIDS, OHIO.

HEDGE-TRIMMER AND LAWN-MOWER COMBINED.

SPECIFICATION forming part of Letters Patent No. 421,241, dated February 11, 1890.

Application filed May 27, 1889. Serial No. 312,268. (No model.)

*To all whom it may concern:*

Be it known that I, OMAR C. CARR, a citizen of the United States, and a resident of Grand Rapids, in the county of Wood and State of Ohio, have invented certain new and useful Improvements in a Hedge-Trimmer and Lawn-Mower Combined; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of the invention. Fig. 2 is a detail.

This invention relates to certain improvements in lawn-mowers; and the nature of the invention consists of the novel combination of parts and their construction, as will fully appear from the following description and illustration.

In carrying out my invention I employ a carrying bar or pole A, which normally stands in an inclined position. This bar or pole is connected at its forward or lower end to the frame $a$ of the ordinary cutting apparatus or mechanism of a lawn-mower. This bar or pole A is upheld in its inclined position by means of a standard or pendant $b$, adapted to permit of the connection with its lower end of the caster-wheel B. To the extreme outer or upper end the pole A at one side is applied a handle or arm $c$ for the convenient handling or manipulation of the implement.

$d$ is a shaft journaled in hangers or brackets $d'$, one secured to the under side of the bar or pole at one edge thereof and the other to a lateral arm or extension $d^2$ of the bar or pole A. One end of this shaft $d$ carries a sprocket-wheel $e$, around which passes an endless chain belt $f$, also encompassing a second similar wheel $e'$, whose shaft $e^2$ is journaled upon the pole or bar A near its upper end, and which has applied to one end a crank or handle $g$ to effect the wheel $e'$ for driving the belt $f$. Upon the opposite end of the shaft $d$ is secured a beveled pinion or gear-wheel $h$, which meshes with a similar pinion or gear-wheel $h'$, whose shaft is journaled in the arm or extension $d^2$ of the pole or bar A. On the upper end of this shaft is a crank-wheel $h^2$, which is connected by a pitman $i$ with one end of a lever $j$, pivoted upon the pole or bar A, the opposite end of which lever actuates the cutting mechanism of the mower. By turning the crank $g$ motion will be imparted to the endless chain belt $f$, which in turn will transmit to the gearing, which will through the pitman and lever actuate the cutting mechanism of the mower. It will be noted that by means of this construction of parts the cutting apparatus can be passed or used in, under, or among shrubbery or plants without injuring them, as also for trimming hedges and the like, without risking the impairment of driving mechanism.

Having described this invention, what I claim, and desire to secure by Letters Patent, is—

The combined hedge-trimmer and lawn-mower consisting of the pole or bar connected to the frame of the cutting apparatus and borne by the standard, having at its lower end a caster-wheel, the pitman pivoted upon said pole or bar and connected to the cutting apparatus, the two shafts disposed at right angles to each other and geared together and supported in brackets or bearings, one secured to one side of said pole or bar and the other secured to the under side of said pole or bar, the link or rod eccentrically connected to a disk upon the upper end of one of said shafts, the sprocket wheels or pinions, one journaled in the side of said pole or bar near its upper end and its shaft having a handle, the other sprocket-wheel being secured to the shaft on the under side of the pole, and the endless belt or chain encompassing said sprocket wheels or pinions, substantially as set forth.

In testimony whereof I affix my signature in presence of two witnesses.

OMAR C. CARR.

Witnesses:
    E. Y. LASKEY,
    JAS. J. VORHES.